Nov. 18, 1969 J. P. PILLER 3,478,787
SELF-OILING MEANS FOR SAW CHAIN LINKS
Filed March 30, 1967

INVENTOR.
JACOB P. PILLER
BY
*F. R. Geisler*
ATTORNEY

United States Patent Office 3,478,787
Patented Nov. 18, 1969

3,478,787
SELF-OILING MEANS FOR SAW CHAIN LINKS
Jacob P. Piller, Washougal, Wash. 98671
Filed Mar. 30, 1967, Ser. No. 627,266
Int. Cl. B27b *33/14, 17/12;* F16g *13/07*
U.S. Cl. 143—135                                2 Claims

ABSTRACT OF THE DISCLOSURE

Means through which oil delivered from the bar or blade of a chain saw into the peripheral saw chain channel of the bar will, upon the rapid travel of the saw chain, automatically be caused to pass to the pivot pins in the saw chain links where lubrication need is greatest.

BACKGROUND OF THE INVENTION

In conventional types of chain saws, in which a driven endless saw chain travels around the periphery of the bar of the chain saw, a considerable amount of wear occurs on the pivot pins by which the various links of the chain are connected and correspondingly on bearing surfaces surrounding these pins in the links. For this reason it has been customary to give saw chains a special oiling from time to time when the saw is not in use by applying oil manually to the pins and surrounding bearing surfaces. As is well known, such manual oiling of the chain takes considerable time.

With some chain saws means are provided for supplying oil constantly to the peripheral groove of the saw bar in which the saw chain travels. In such cases some of the oil from the groove on the bar was found to be drawn out on the links during the operation of the chain as a result of centrifugal force, provided the chain was driven at only moderate speed, and supposedly a portion of this oil reached the location of the pins. Examples of prior patents showing means for supplying oil to the peripheral groove on the bar of chain saws are U.S. Patent No. 2,748,810, issued June 5, 1956, and U.S. Patent No. 2,765,823, issued Oct. 9, 1956.

While it is possible that some oil does get to the pins in the chain in such cases, it has also be found that generally insufficient lubrication of the chain can be obtained in this manner, and that it is also necessary to oil these chains manually from time to time to reduce the rate of the wear occurring on the pins and bearings. Modern saw chains are customarily driven at much higher speeds than in former times, and when the saw chain is driven at very high speed the tendency is for any oil on the chain to be thrown off before it has a chance to move out over the surface of the links sufficiently so that some of it can reach the location of the pins, with still less likelihood in such cases that any oil will penetrate in around the pins and provide any appreciable lubrication there.

An early attempt to provide positive lubrication for the pins and bearings in a saw chain is shown in U.S. Patent No. 1,397,026, issued Nov. 15, 1921. In the saw chain in this patent shallow grooves were formed on some of the links which lead outwardly from the inner edge of the link in a direction perpendicular to the line of travel of the link and lead to recesses adjacent to the bearings for the link pins, and felt oil-retaining pads were placed in these recesses. Aside from the impracticability of providing saw chain links with such oil pads, the fact that any oil in the shallow grooves leading to the pads would undoubtedly be swept from such grooves in a rapidly traveling chain before reaching the pads probably explains why such special oiling means was apparently never accepted by the industry. Up to the present time the oiling of saw chains appears to be confined to the supplying of oil to the peripheral groove in the chain saw bar and to periodic oiling of the chain by manual oiling of the pins and pin bearings.

SUMMARY OF THE INVENTION

The present invention has been developed in order to solve the problem of keeping the pins and bearings for the pins on a saw chain properly oiled, without necessitating the heretofore customary hand oiling of the chain during rest periods. The oiling means of this invention includes specially formed channels on the surfaces of the saw links which lead from the inner edges of the links in the peripheral groove of the chain saw bar outwardly to the pins, the oil being supplied to the peripheral groove on the bar of the chain saw in a well known manner. Each of these special channels leads outwardly in a direction sloping obliquely away from the direction of travel of the chain and links. The direction in which each channel extends with respect to the direction of chain travel and the slope of the channel walls are arranged in such a manner as to act in the manner of oil scoops and to cause part of the oil in the groove on the chain saw bar to travel along each channel outwardly to the terminus of the channel and consequently to the corresponding pin and pin bearing.

DESCRIPTION OF THE PREFERRED EMBODIMENTS

Figure 1:
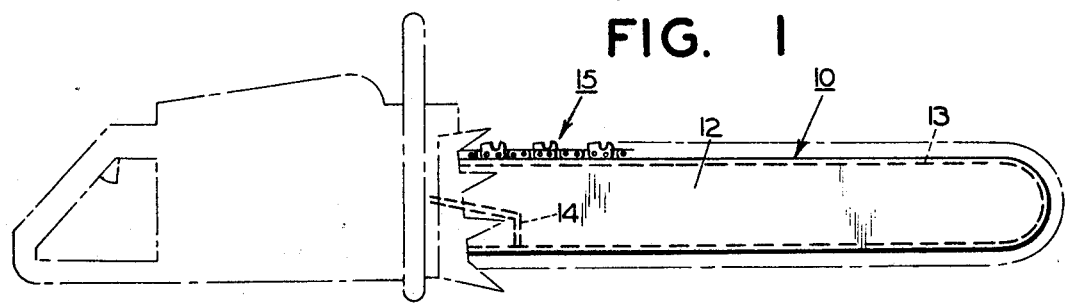
FIG. 1 is a more or less diagrammatic side elevation of a conventional chain saw showing the bar or blade of the saw and portion of the saw chain in full line, and indicating in broken lines the peripheral groove on the saw bar and an oil channel leading from an oil reservoir (not shown) down to the peripheral groove.

In the drawings the bar or blade for the chain saw is indicated as a whole by the reference 10. The bar 10 is composed of a center plate 11 (FIGS. 2 and 3) and two opposite identical side plates 12 and 12' which are secured to the two faces of the center plate in any siutable manner, for example by spot welding. The two side plates 12 and 12' have their peripheral edges extending out beyond the peripheral edge of the center plate 11 and thereby form the peripheral groove 13 on the saw bar. The saw chain, designated as a whole by the reference 15 in the drawings, travels in the peripheral groove 13 in the direction indicated by the arrow X in FIG. 2, being driven by suitable power means (not shown). Since chain saws of this general type are old and well known in the art, further description of the body portion of the saw is not necessary.

As previously indicated, it is also old in the art to provide means for delivering oil continuously into the peripheral groove on the saw bar, and in the saw illustrated it is assumed that oil is delivered from a suitable supply reservoir (not shown) through a channel 14 within the saw bar to the peripheral groove 13. The present invention is concerned only with the saw chain itself, and, more specifically, with the means through which some of the oil deposited in the peripheral groove 13 will be delivered definitely to the pins and bearing surfaces about the pins in the saw chain.

Figure 2:
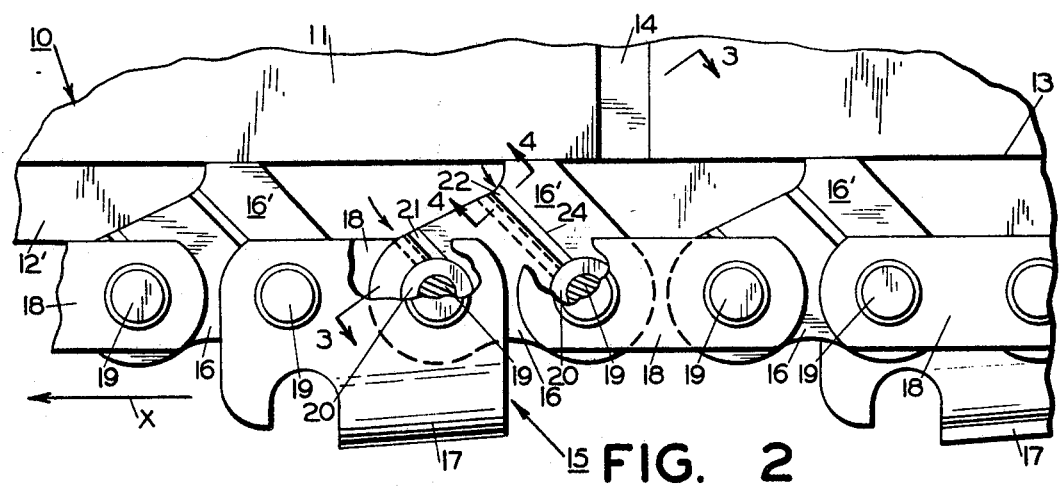
FIG. 2 is a fragmentary sectional elevation of the saw bar or blade and a fragmentary side elevation of the saw chain, drawn to a larger scale, with portions of the near side links of the chain broken away for clarity.
Figure 3:
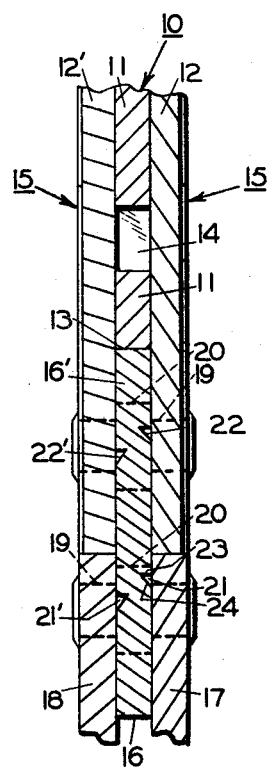
FIG. 3 is a fragmentary section on line 3—3 of FIG. 2.

The particular saw chain 15 illustrated in FIGS. 2 and 3 consists of a series of identical driving links 16, having sprocket root portions 16' which are engaged by the driving sprocket (not shown) operated by the power means for the saw, and which root portions of the driving lings in the endless saw chain travel in the peripheral groove 13. Each consecutive pair of these driving links 16 are connected on alternate sides by right and left hand cutter links 17 of well known construction and configuration. Pairs of opposite side links 18 connect the consecutive pairs of driving links, while similar side links connect the driving links in each consecutive pair on the side opposite the cutter link. Thus, in the particular saw chain illustrated in FIG. 2 the driving links 16 are connected on opposite sides either by a pair of side links or by one side link and a cutter link. This particular saw chain is of more or less standard type and is illustrated and described only for the purpose of explaining the invention and its manner of operation.

As in the case of all standard types of saw chains, each link of the chain is connected through the medium of a pair of pins with a preceding and a following link respectively. The connecting pins for the links are shown at 19 in FIG. 2 and, as apparent in the chain illustrated, each pin consequently extends through three links with the driving link being the center link in the three. With such chains the pins are generally firmly secured at their opposite end portions to the two outside links respectively and consequently the wear on the pins occurs where these pins are engaged by the center links (and thus by the driving link 16 in the chain illustrated). In order to provide for a more enduring wearing surface at this portion, each pin is customarily provided with a bearing collar the periphery of which is given a special hardening treatment, and the apertures in the center links 16 for the pins are consequently made of correspondingly greater diameter to accommodate the bearing collars on the pins. In FIG. 2 these bearing collars are indicated at 20.

In order to cause oil to be delivered to the bearing collars 20 for the pair of pins 19 on which each center link 16 is mounted, and through which pins and bearing collars the link is pivotally connected to the preceding and following links, a pair of oil channels 21 and 22 (FIG. 2) on one face of each link 16 are so arranged as to lead from the forward and inner edge of the sprocket root portion to the pair of pins respectively. These oil channels extend to the pins or pin bearing collars in an obliquely and outwardly sloping direction inclined away from the direction of travel of the chain. Preferably these oil channels extend in a direction having an angularity of approximately 45° with the line of chain travel.

The oil channels 21 and 22 are preferably parallel and are identical in cross-sectional shape and size. Thus, as shown best in FIG. 4, the rear side wall 23 of each channel (in the direction of travel of the chain) is substantially perpendicular to the face of the link, while the forward side wall 24 is inclined inwardly from the face of the link until it meets the bottom of the rear side wall. The reason for this special shape of the oil channels will be readily appreciated, for, as the link moves forwardly in its travel, the vertical rear wall 23 will prevent any appreciable part of the oil which is scooped up by the inner end of each oil channel from spilling out over the rear side of the channel while the pull of centrifugal force draws the oil down along the channel to the discharging end at the pin location. At the same time oil on the face of the link ahead of the channel would have a tendency to be drawn down the inwardly inclined forward wall 24 into the channel.

The oil channels 21 and 22 are not of sufficient depth to cause any appreciable weakening of the link on which they are formed. A maximum depth not to exceed one-third of the thickness of the link is preferable, and has been found adequate for average saw chains.

Figure 4:
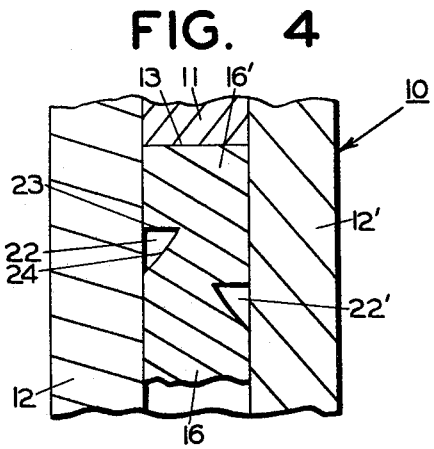
FIG. 4 is a fragmentary section on line 4—4 of FIG. 2 drawn to a still larger scale.

Preferably, although not necessarily, a similar and corresponding pair of oil channels are provided on the opposite or second face of the link, as indicated at 21' and 22' in FIGS. 2, 3, and 4. These additional oil channels are identical in cross-sectional size and form to those of the first mentioned face, as shown in FIG. 4, and lead in the same direction to the same two pins or bearing collars respectively. As apparent, the providing of oil channels on both faces of the link results in the delivery of a larger amount of oil to the pins and bearings and insures oiling of the bearings from both sides of the link.

When these oil channels are provided on both faces of tthe link it is desirable that the oil channels on one face should be staggered with respect to the corresponding oil channels on the other face. This avoids the weakening of the link which would occur if the bottoms of the corresponding opposite links were arranged in the same transverse planes extending through the links. Such staggering of the opposite links 21, 21' and 22, 22' is indicated clearly in FIGS. 2, 3, and 4.

Thus, if oil is supplied continuously to the peripheral groove of the chain saw bar as previously mentioned, the rapid travel of the saw chain around in the peripheral groove will result in some of the oil from the groove being scooped up by the oil channels and delivered directly and positively to the pins or pin bearing surfaces of the chain. Heretofore the supplying of oil to the groove in the chain saw bar continuously during the operation of the chain saw resulted in a considerable amount of the oil being thrown off from the rapidly traveling chain and wasted. In contrast, with the employment of the present invention the proportionate amount of such oil thrown off from the chain has been found to be greatly reduced.

While the invention has been illustrated and described as used with a saw chain of particular construction, it is to be understood that the invention is equally suitable for use with any similar saw chain since all such saw chains have driving links with sprocket root portions and in all cases the driving links are connected with the other links in the chain by means of pairs of pins, so that the providing of a pair of oil channels in one or both faces of each driving link as herein described will result in oil being delivered to all the pins of the chain in the same manner.

I claim:
1. In a chain saw of the character described having an endless saw chain and a saw bar with a peripheral groove forming a track for the saw chain and provided with lubricating oil, a plurality of identical links in the saw chain having root portions riding in the saw groove, each of said links mounted in the saw chain on a pair of pivot pins, a side face of each of said links formed with a pair of oil channels leading obliquely outwardly from the forward edge of the root portion of the link directly to the pair of pivot pins for the link respectively, both of said channels inclined in the direction opposite the direction of travel of the saw chain, each of said channels having a rear wall with respect to the direction of travel of the link so arranged as to extend in a plane substantially perpendicular to the plane of said side face of the link and having a forward wall inclined inwardly from said face to the bottom of said rear wall, whereby some of the lubricating oil in the saw bar groove will be scooped up by the inner forward ends of said oil channels in the operation of the chain saw and drawn along said channels to said pins, thereby automatically providing lubrication for said pins.

2. The combination set forth in claim 1 with the addition of a similar pair of oil channels of similar cross-sectional form on the other side of the link leading in the same direction to said pins respectively.

References Cited

UNITED STATES PATENTS

| | | | |
|---|---|---|---|
| 1,297,026 | 11/1921 | Wolf | 143—32 |
| 3,292,670 | 12/1966 | Rätz et al. | 143—32 |

DONALD R. SCHRAN, Primary Examiner

U.S. Cl. X.R.

74—257; 143—32